United States Patent [19]

Hutchison

[11] Patent Number: 5,417,342
[45] Date of Patent: May 23, 1995

[54] PACKAGING FOR FRAGILE ARTICLES

[75] Inventor: Joel P. Hutchison, San Antonio, Tex.

[73] Assignee: Miriam M. Benson, San Antonio, Tex.

[21] Appl. No.: 191,489

[22] Filed: Feb. 4, 1994

[51] Int. Cl.⁶ ............................ B65D 5/56; B65D 5/32
[52] U.S. Cl. .................................... 220/410; 220/441;
220/443; 229/23 BT; 229/125.23
[58] Field of Search ......... 229/23 BT, 125.21, 125.23,
229/132; 220/408, 410, 416, 418, 441, 443

[56] References Cited

U.S. PATENT DOCUMENTS

| | | | |
|---|---|---|---|
| 1,451,612 | 4/1923 | Hausner | 229/125.23 |
| 2,028,661 | 1/1936 | Gustafson et al. | 229/125.21 |
| 2,761,610 | 9/1956 | Welshenbach | 229/23 BT |
| 2,808,190 | 10/1957 | Buhrmaster et al. | 220/410 |
| 2,936,941 | 5/1960 | Lewis . | |
| 3,236,206 | 2/1966 | Willinger | 220/441 |
| 3,285,492 | 11/1966 | Denby et al. | 220/443 |
| 3,516,596 | 6/1970 | Madden et al. | 220/441 |
| 3,721,381 | 3/1973 | Locke | 229/23 BT |
| 3,875,843 | 4/1975 | Maeda et al. | 229/125.21 |
| 3,890,762 | 6/1975 | Ernst et al. | 220/441 |
| 3,979,046 | 9/1976 | Wilbur . | |
| 4,151,912 | 5/1979 | Harrold . | |
| 4,333,602 | 6/1982 | Geschwender | 229/132 |
| 4,433,781 | 2/1984 | Hummel . | |
| 4,586,602 | 5/1986 | Levey | 220/441 |
| 4,730,748 | 3/1988 | Bave | 220/441 |
| 4,903,493 | 2/1990 | Van Iperen et al. . | |
| 4,911,962 | 3/1990 | Baumann et al. . | |
| 4,928,847 | 5/1990 | Hollander et al. | 220/408 |
| 5,009,326 | 4/1991 | Reaves et al. | 220/410 |
| 5,154,309 | 10/1992 | Wischusen, III et al. | 220/410 |
| 5,193,701 | 3/1993 | Bush et al. . | |

FOREIGN PATENT DOCUMENTS

| | | |
|---|---|---|
| 692219 | 8/1964 | Canada ............................ 229/23 BT |
| 856558 | 12/1960 | United Kingdom . |
| 966623 | 8/1964 | United Kingdom . |
| 2028277 | 3/1980 | United Kingdom . |

OTHER PUBLICATIONS

The Encyclopedia of Packaging Technology, John Wiley & Sons, pp. 226,227 (1986).
Corrugated to Solid Fibreboard Boxes & Products, Fibre Box Association, p. 16 (1974).

Primary Examiner—Gary E. Elkins
Attorney, Agent, or Firm—Richard C. Litman

[57] ABSTRACT

A telescoping shipping container for fragile articles and formed of corrugated sheet material includes an upper portion and a lower portion, each respectively having an upper end and a lower end with standard flap closure. The upper portion telescopes completely over the lower portion, to effectively double the thickness of the side walls of the package. The inner/lower portion includes a complete lining of resilient foam padding for further protection of articles contained therein; the inside of the upper lid is also similarly lined. By forming each portion of double plies or laminates of corrugated material, the sides of the closed package or container effectively include four corrugated layers, which along with the resilient foam lining, provides superior protection against penetration and damage to the package. The corrugated material may be cardboard, plastic, or other suitable sheet material capable of being similarly formed. A reusable seal or closure is included so that the package may be reused, if desired. The packaging is particularly valuable for the shipping of personal computers and related components, but may be used for shipment of virtually any fragile article, depending upon the specific interior padding used.

19 Claims, 2 Drawing Sheets

PACKAGING FOR FRAGILE ARTICLES

FIELD OF THE INVENTION

The present invention relates generally to packaging, shipping, and mailing containers, and the like, and more specifically to a package or container adapted for use in shipping or mailing fragile articles or instruments, such as computers and the like. The container is reusable and includes two telescoping sections, resulting in a side wall thickness equal to both container portions.

BACKGROUND OF THE INVENTION

The centralization of various businesses and industries has resulted in an ever expanding need for the transport of articles of manufacture from the place of manufacture to the distributor, and ultimately to the consumer. While many types of products may be produced in several different areas of the country (e. g., processed foods), thus reducing shipping costs, many other relatively complex articles of manufacture are produced only in one or a very few areas, resulting in the need to ship or mail those articles to various other locations.

This is particularly true in the computer industry, where the manufacture of personal computers has been developed in a very few areas of the country, generally concentrated on the east and west coasts, due to the establishment of technological bases and expertise at those locations. As such products are universally in demand, the result has been the need to ship such articles relatively great distances across the country and internationally.

While such shipping and mailing requires no advanced technology for relatively sturdy devices, the use of existing shipping and mailing containers for computers and other relatively complex and fragile articles has resulted in a relatively high damage ratio for such articles in shipping. Often the reason for such damage is the penetration or deflection of the side walls of the shipping or mailing container, and/or the crushing of the container due to stacking of other articles thereabove.

The need arises for a container or package particularly adapted for the shipment or mailing of fragile articles, e. g., computers and the like. The package must provide relatively high compressive strength for the vertical side walls, and moreover must provide relatively high resistance to penetration and bending of the side walls. While it is important that the package be relatively inexpensive to manufacture and of relatively light weight to conserve shipping and mailing expenses, it is also important that the container provide for reuse for more efficient use of resources and greater economy.

DESCRIPTION OF THE PRIOR ART

U.S. Pat. No. 2,936,941 issued to Charles Lewis on May 17, 1960 discloses Cartons having limited telescoping action. One carton has a series of tongues or flaps extending upward from the sides thereof, and the other carton is installed inverted on the first carton, with the sides of the second carton alternatingly engaging the flaps of the first carton to the inside or outside. Thus, the edges of the second carton sides cannot telescope to the bottom of the first carton to provide double side walls along the entire side of the carton, as in the present invention.

U.S. Pat. No. 3,979,046 issued to Charles J. Wilbur on Sep. 7, 1976 discloses a Special Shipping Case Having Modified End Flaps. No telescoping is disclosed; rather, the top or lid of the case is hingedly attached to one wall of the case, and the upper walls of the case are provided with a secondary lip to add to the wall thickness to preclude cutting completely through the case walls when removing the lid. As the case is cut open, it is not reusable as in the present invention.

U.S. Pat. No. 4,151,912 issued to John H. Harrold on May 1, 1979 discloses a Storage Container having upper and lower compartments. The compartments may be at least partially lined with a resilient material to hold the contents in place. However, no complete resilient lining is disclosed, no disclosure is made of the manufacture of the container from corrugated laminates of materials, and the compartments cannot telescope, as in the present invention.

U.S. Pat. No. 4,433,781 issued to Donald A. Hummel on Feb. 28, 1984 discloses a Compact Dual Bell Section Trombone Case. The padded rectangular case includes a generally diagonal partition therein for the secure carriage of specifically shaped articles. While the present invention may include movable diagonal or otherwise positioned partitions therein, as well as resilient padding, the fixed partition, inability to telescope, hinged lid, and relative cost of the Hummel instrument case preclude use in the environment of the present invention.

U.S. Pat. No. 4,903,493 issued to Willem H. P. Van Iperen et al. on Feb. 27, 1990 discloses Heat Sink Protective Packaging For Thermolabile Goods. The substance of the disclosure is a means of protecting thermosensitive goods by enclosing them in a salt having a specific melting temperature. However, Van Iperen et al. also disclose a container including non-resilient insulation therein (cardboard, paper, plastic, or wood). The insulation is incapable of providing significant protection against physical shock or damage, as in the present invention, and no telescoping means is provided for the container.

U.S. Pat. No. 4,911,962 issued to Hansjorg Baumann et al. on Mar. 27, 1990 discloses an Insulating System For Thermally-Insulated Containers. Only a single sheet of material is disclosed for the outer wall, and two layers of material are installed therein. The first layer is an impact absorbing layer of soft, elastic material, while the second (innermost) layer is a thicker layer of hard foam for thermal insulation. The third, thermal insulation layer is beyond the scope of the present invention, and no telescoping means or corrugated laminates are disclosed.

U.S. Pat. No. 5,193,701 issued to Thomas J. Bush et al. on Mar. 16, 1993 discloses a Box For Storing Hanging File Folders comprising a box formed of chipboard sheets and having a hinged lid and internal plastic frame components. Virtually the only point of commonality between the Bush et al. box and the container of the present invention is the provision of hand holds on opposite walls.

British Patent No. 856,558 to Loewenstein and Hecht Ltd. et al. and published on Dec. 21, 1960 discloses Improvements In Or Relating To Packing. The outer case is formed of cardboard; however, no disclosure is made of the use of corrugated material. It appears that the disclosed cardboard material comprises only a single sheet, rather than multiple sheets having corrugations sandwiched therebetween, as in the present invention. Moreover, the single wall and hinged lid preclude any telescoping capability.

British Patent No. 966,623 to Leonard Gould and Co., Ltd. and published on Aug. 12, 1964 discloses Improvements In Packs For Containing Delicate Or Fragile Articles. An inner container primarily comprising a plurality of resilient, shock absorbing components is wrapped on four of its six sides by a sheet of corrugated cardboard. The assembly is inserted into a standard corrugated cardboard box having upper and lower closure flaps. The insert does not include any closure flaps nor form any part of the outer container, but is completely enclosed therein when the assembly is complete, unlike the present invention. As the outer box is described as "ordinary", it would seem that the flaps would be permanently affixed in place (i. e., glued) so that the outer box would be damaged when opened, thus precluding the reuse of at least the outer box of the assembly.

Finally, British Patent No. 2,028,277 to Barbara Kremp and published on Mar. 5, 1980 discloses an Isothermal Container having separate side panels of foam insulating material each completely encased in a layer of corrugated cardboard. The side members nest vertically and are retained within a bottom member and a lid during use, but may be disassembled and laid flat between the bottom and the lid for storage. The disassembly and assembly of the container is not at all like the telescoping of the present packaging, nor does the Kremp container provide four corrugated layers when assembled, as in the present invention.

None of the above noted patents, taken either singly or in combination, are seen to disclose the specific arrangement of concepts disclosed by the present invention.

SUMMARY OF THE INVENTION

By the present invention, improved packaging for fragile articles is disclosed.

Accordingly, one of the objects of the present invention is to provide improved packaging for fragile articles which includes an upper and a lower container portion, which container portions telescope together completely to the entire depth of their side walls.

Another of the objects of the present invention is to provide improved packaging for fragile articles which container portions are formed of multiple laminations of corrugated cardboard, plastic, or other sheet material.

Yet another of the objects of the present invention is to provide improved packaging for fragile articles which provides a double thickness of the side walls when the two container portions are telescoped together, thus substantially reducing damage to the container and to any article(s) therein.

Still another of the objects of the present invention is to provide improved packaging for fragile articles which includes the complete lining of the inner walls of the innermost container portion with resilient foam material, which foam material serves to protect further any fragile article(s) within the packaging and further serves to strengthen the container walls to which it is attached.

A further object of the present invention is to provide improved packaging for fragile articles which upper and lower portions each include standard closure means respectively at their top and bottom ends.

An additional object of the present invention is to provide improved packaging for fragile articles which includes reusable securing means providing for the closure of the two telescoping portions of the packaging.

Another object of the present invention is to provide improved packaging for fragile articles which includes means providing for ease of lifting the assembled package, or either of the upper or lower portions thereof.

Yet another object of the present invention is to provide improved packaging for fragile articles which is reusable.

A final object of the present invention is to provide improved packaging for fragile articles for the purposes described which is inexpensive, dependable and fully effective in accomplishing its intended purpose.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters denote corresponding features consistently throughout the several figures of the attached drawings.

DETAILED DESCRIPTION OF THE PREFERRED EMBODIMENT

Figure 1:
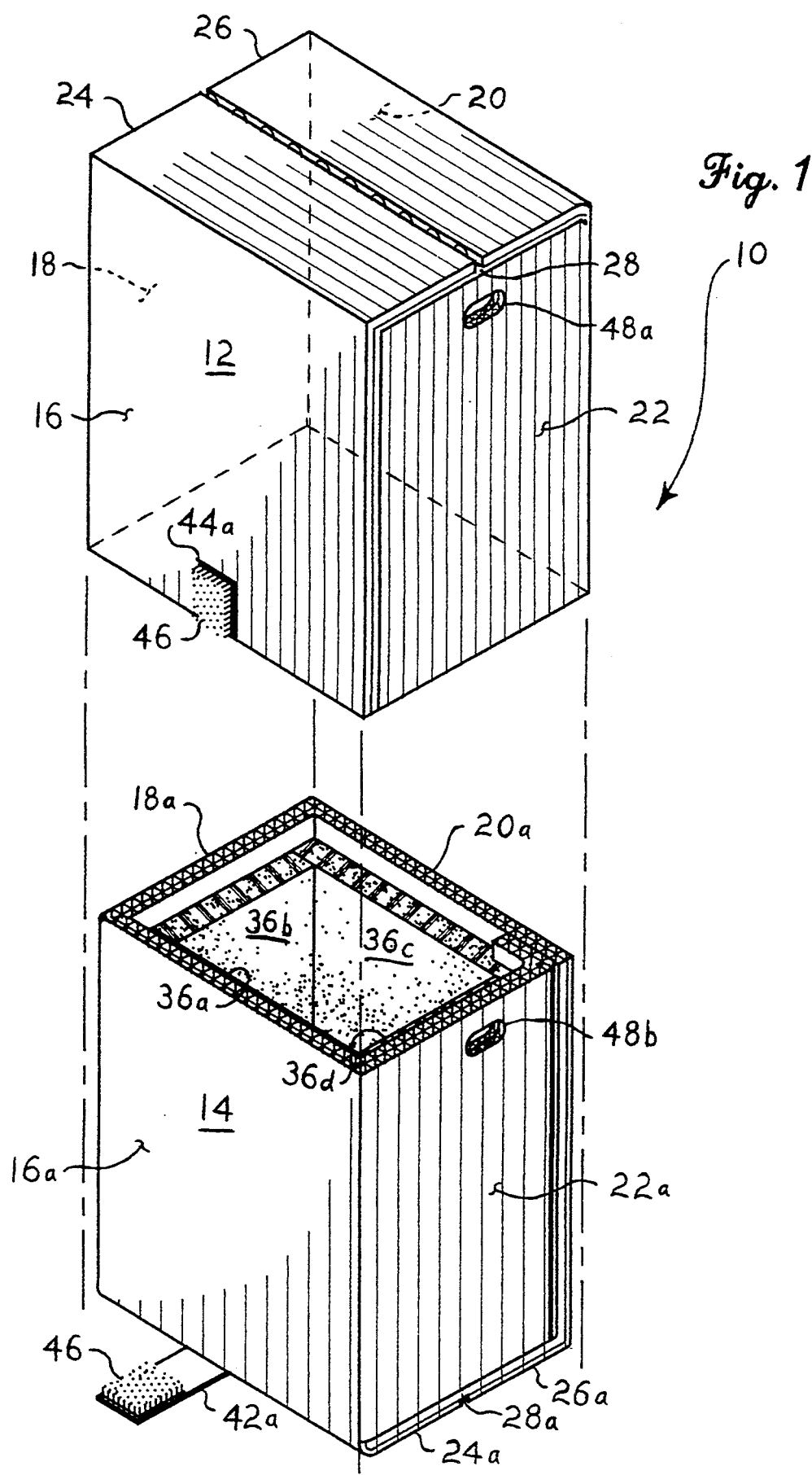
FIG. 1 is an exploded perspective view of the telescoping container or shipping package of the present invention, showing the upper portion thereof removed from the lower portion.

Referring now particularly to FIG. 1 of the drawings, the present invention will be seen to relate to a telescoping shipping container 10, preferably formed of corrugated sheet material. Container 10 generally comprises an upper portion 12 and a lower portion 14, which upper portion 12 is formed to fit closely over the lower portion 14. The upper and lower portions 12 and 14 are each similarly formed, with the upper portion 12 having first through fourth sides 16, 18, 20, and 22, and the lower portion 14 having corresponding first through fourth sides 16a, 18a, 20a, and 22a. The upper and lower portions 12 and 14 also respectively include conventional upper and lower flap closures, comprising opposite upper major flaps 24 and 26, upper minor flaps 28 and 30 (the edges of which may be seen respectively in FIGS. 1 and 2), and corresponding lower major and minor flaps 24a through 30a.

The relative dimensions of the upper portion 12 and lower portion 14 are carefully formed so as to provide an interior width and length for the upper portion 12 which is little, if any, larger than the corresponding exterior width and length of the lower portion 14. When the upper and lower portions 12 and 14 are thus formed, the upper portion 12 can telescope over the lower portion 14, with the two portions 12 and 14 closely fitting one another and effectively providing a single, closed shipping container 10 having a wall thickness equal to the individual wall thicknesses of the upper portion 12 and the lower portion 14 added together.

Similarly, the height of the four respective cooperating sides 16/16a through 22/22a will be seen to be substantially equal, so that when the two portions 12 and 14 are completely telescoped together, the upper edge 32 of the lower portion 14 is immediately adjacent the interior or minor flaps 28 and 30 of the upper portion 12, and the lower edge 34 of the upper portion 12 is substantially even with the outer or major closure flaps 24a and 26a of the lower portion 14. The substantially complete overlapping of the sides of the two portions 12 and 14 will be seen to provide an assembled container 10 having a side wall thickness greater than either portion 12 or 14 alone, and providing significant additional strength. As the upper and lower flap closures each comprise doubled layers of material due to the overlapping of the major and minor flaps, it will be seen that the substantially rectangular solid shape of the present container 10 is provided with doubled side thicknesses on each of the six sides when assembled, to provide and extremely sturdy and durable container.

Further container strength and protection for fragile articles contained therein is provided by the resilient padding 36, comprising a total of six sheets corresponding to the six interior surfaces of the container 10. Four side sheets 36a through 36d are secured respectively to the interior of the sides 16a through 22a of the lower portion 14, while a fifth bottom sheet 36e is secured to the interior of the lower flap closure of the lower portion 14 of the container 10. A sixth sheet 36f is secured to the interior of the upper flap closure of the upper portion 12 of the container 10. Thus, when the two container portions 12 and 14 are assembled to form a completed container 10, the interior space is completely padded by the resilient sheets 36a through 36f.

The resilient padding sheets 36a through 36f may be formed of any suitable resilient material, e.g., a synthetic plastic closed cell foam, etc. A padding material 36 having the proper rigidity and density has been found to be compatible with the multiple plies of material used in the construction of the side walls and upper and lower closures of the upper and lower portions 12 and 14, providing additional protection against bending and penetration of the side walls and closures. Additional sheets of resilient padding material (not shown) may be included within the container 10 to provide protection for specific shapes and sizes of equipment contained therein, as desired.

Figure 2:
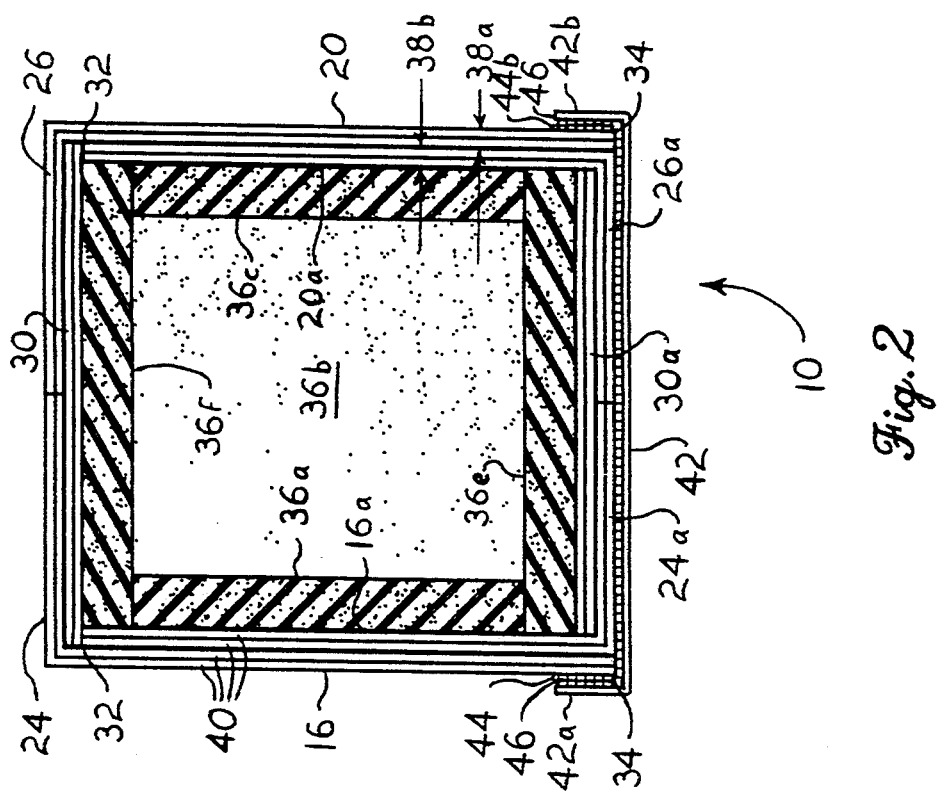
FIG. 2 is an elevation view in section through the assembled upper and lower container portions, showing internal details.
Figure 3:
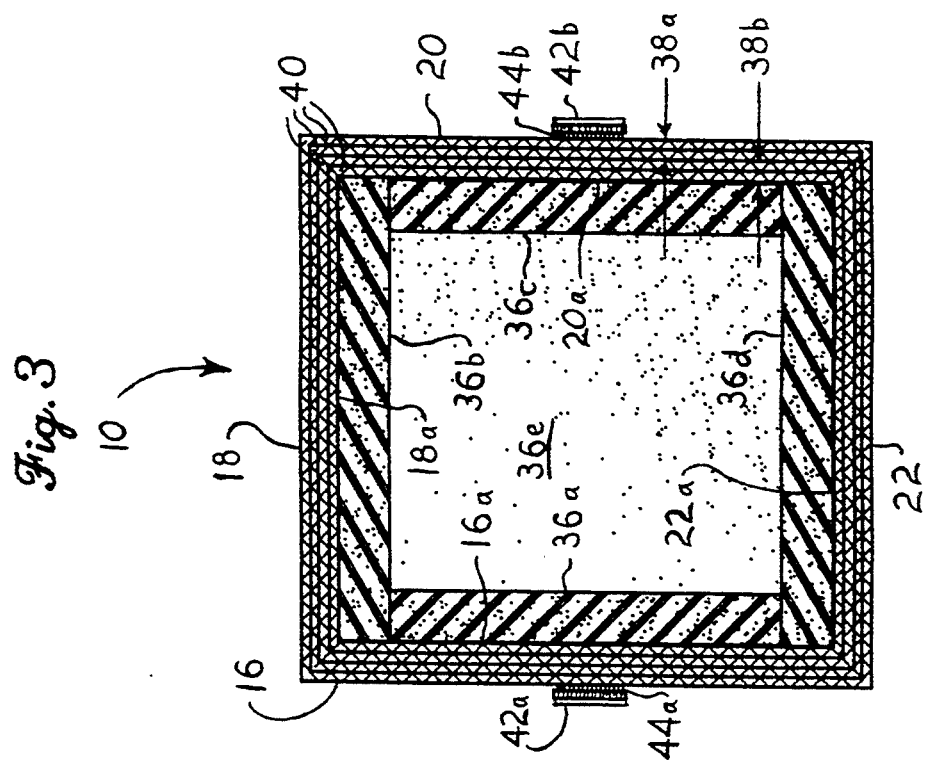
FIG. 3 is a plan view in section through the assembled upper and lower container portions, showing further details.

Preferably, the material used for the side walls and upper and lower closures of the upper and lower portions 12 and 14 comprises multiple plies of corrugated sheet material, as shown in the drawings. A review particularly of FIGS. 2 and 3 shows that the upper portion 12 and lower portion 14 respectively each have wall thicknesses 38a and 38b comprising two corrugated laminations of material, with the individual corrugations or flutes 40 oriented vertically. This vertical orientation of the flutes or corrugations provides superior compressive strength in the vertical direction, particularly when the container 10 is completely assembled to provide a total of four plies or laminations of vertically oriented corrugations, with the interior resilient padding sheets 36 providing additional resistance to bending for the side walls of the lower portion 14, and thus precluding substantial bending of the side walls of the upper portion 12 due to their overlying contact with the lower container 14 side walls. The result is an exceptionally sturdy and durable container 10, for its weight and manufacturing cost.

Preferably, the corrugated sheet material which is used to form the multiple plies of the upper and lower portions 12 and 14, comprises corrugated cardboard material. However, similarly formed plastic sheet material may also be used for greater durability and weather resistance, if desired, as well as other alternative materials.

In order to provide for the reuse of the container 10, a releasable and reclosable attachment or seal is provided for the two portions 12 and 14 of the container 10. A strap 42 is permanently secured completely across exterior of the two lower major flaps 24a and 26a of the lower portion 14, with the strap having free opposite first and second ends 42a and 42b extending therefrom. The upper portion 12 includes opposite cooperating tabs 44a and 44b permanently secured adjacent the lower edge 34. The container 10 is closed and sealed by telescoping the upper portion 12 over the lower portion 14, and wrapping the free ends 42a and 42b of the underlying strap 42 upward to secure them to the respective tabs 44a and 44b of the upper portion 12 of the container 10. The strap ends 42a and 42b and tabs 44a and 44b may comprise complementary, mating hook and loop fastener material 46, or other suitable securing means. The passage of the underlying strap 42 will be seen to provide greater strength and security to the bottom closure flaps 24a through 30a of the lower portion 14 of the container 10, which, along with the provision of a resilient padding sheet 36e secured to the interior of the lower or bottom flap closure, provides a substantial means of preventing the inadvertent opening of the lower flap closure.

The present container 10 also includes provision for the convenient carriage thereof by means of opposite hand holds 48a and 48b formed respectively near the upper closure of the opposite sides 18 and 22 of the upper portion 12, and near the upper edge 32 of the opposite sides 18a and 22a of the lower portion 14, as shown in FIG. 1. (The hand holds of sides 18 and 18a are not visible in the drawings, but it will be understood that the present container 10 is substantially symmetrical and that features of one side of the container 10 are repeated on the opposite, mirror image side of the container 10.) Due to the provision of the hand holds near the upper edges of their respective sides, the hand holds 48a and 48b are congruent and in substantial alignment with one another when the two portions 12 and 14 of the container 10 are completely telescoped together. Thus, a person lifting the assembled container 10 may insert hands completely through the aligned hand holds 48a and 48b on each side of the container 10, to positively grip both portions 12 and 14 of the container 10 for more positive support thereof. The only resistance to the complete insertion of the hand into the container 10 will be the layer or sheet of resilient padding 36 secured to the interior surface of the sides 18a and 22a of the lower portion 14, which resilient padding 36 provides sufficient flexibility to allow the hands to completely engage the hand holds 48a and 48b.

The present container 10 will be seen to provide a sturdy, durable, and substantial shipping container for various types of fragile articles, instruments, equipment, and the like, due to the preferably multiple ply corrugated construction of the upper and lower portions thereof. With the provision of two corrugated layers or plies of material for each portion of the container 10, a total of four corrugated plies are provided, along with the resilient padding sheets secured to each of the inner surfaces of the container, to provide substantial protection for articles contained therein. The container is easily packed, as the lower portion 14 includes no upper closure flaps to interfere with the insertion of articles therein, and the upper portion 12 is easily telescoped over the lower portion 14 for closure. The bottom strap ends 42a and 42b are then secured to the cooperating tabs 44a and 44b of the upper portion 12; additional security for the contents of the container 10 may be provided by tape or other means, as desired. Both portions 12 and 14 of the container 10 may then be lifted by means of the hand holds 48a and 48b which pass completely through all plies of the side wall material, thus enabling a person lifting the present container to positively support both the upper and lower portions 12 and 14 without reliance on the upper and lower portion attachment means. However, the attachment means, comprising a continuous strap 42 permanently secured across the major closure flaps 24a and 26a of the lower portion 14, provides significant security against the inadvertent opening of the bottom closure of the lower portion 14. The vertical orientation of the corrugations 40 of the various sides, provides substantial vertical compressive strength to preclude crushing of the container due to stacking and heavy weights placed thereon. The present container provides for multiple uses, due to the reclosable strap and tabs provided, thus providing for great economy as well as the other benefits discussed above.

It is to be understood that the present invention is not limited to the sole embodiment described above, but encompasses any and all embodiments within the scope of the following claims.

I claim:

1. A shipping package for fragile articles, comprising:
    an upper portion and a lower portion each having four side walls and respectively having a top and a bottom flap closure, with said four side walls of said upper portion and said lower portion being of substantially equal height;
    said upper portion halving said side walls dimensioned so as to closely fit over and completely cover and enclose said side walls of said lower portion, thereby providing for the complete telescoping of said upper portion over said lower portion of said shipping package;
    said four side walls and said flap closures of said upper portion and said lower portion being formed of at least two plies of corrugated sheet material, whereby said shipping package has four perimeter walls having at least four plies of corrugated material;
    said shipping package having a volume defined by said upper portion and said lower portion when completely telescoped together, said volume being completely lined with resilient padding, and;
    said shipping package further including releasable and reusable closure means providing for the positive securing of said upper portion to said lower portion when said upper portion and said lower portion are completely telescoped together, whereby;
    fragile articles are placed within said lower portion of said shipping package, said upper portion of said shipping package is completely telescoped over said lower portion of said shipping package to completely enclose said volume and the fragile articles contained therein and to completely surround the fragile articles by means of said resilient padding.

2. The shipping package of claim 1 wherein:
    said corrugated sheet material is formed of cardboard.

3. The shipping package of claim 1 wherein:
    said corrugated sheet material is formed of plastic.

4. The shipping package of claim 1 wherein:
    said four side walls and said bottom flap closure of said lower portion and said top flap closure of said upper portion each include an inner surface, and each said inner surface includes said resilient padding adhesively secured thereto.

5. The shipping package of claim 4 wherein:
    said resilient padding comprises synthetic foam material.

6. The shipping package of claim 1 wherein:
    said resilient padding comprises synthetic foam material.

7. The shipping package of claim 1 wherein:
    at least two opposite of said four side walls of said upper portion and said lower portion include hand holds formed therein.

8. The shipping package of claim 7 wherein:
    said hand holds of said upper portion are each substantially in alignment respectively with corresponding said hand holds of said lower portion when said upper portion and said lower portion are completely telescoped together.

9. The shipping package of claim 1 wherein:
    said releasable and reusable closure means comprises cooperating hook and loop fastener material.

10. A shipping package for fragile articles, comprising:
    an upper portion and a lower portion each having four side walls and respectively having a top and a bottom flap closure, with said four side walls of said upper portion and said lower portion being of substantially equal height;
    said upper portion having said side walls dimensioned so as to closely fit over and completely cover and enclose said side walls of said lower portion, thereby providing for the complete telescoping of said upper portion over said lower portion of said shipping package;
    said shipping package having a volume defined by said upper portion and said lower portion when completely telescoped together, said volume being completely lined with resilient padding, and;
    said shipping package further including a strap positively securing said upper portion to said lower portion when said upper portion and said lower portion are completely telescoped together, said strap being secured to and extending completely across said bottom flap closure of said lower portion, said strap having opposite first and second ends extending therefrom and from said bottom flap closure, and cooperating opposite first and second tabs secured to two opposite of said four side walls of said upper portion;
    said upper portion of said shipping package is completely telescoped over said lower portion of said shipping package, and said first and second ends of said strap are releasably secured respectively to said cooperating opposite first and second tabs to releasably secure said upper portion of said shipping package to said lower portion of said shipping package;

whereby fragile articles are placed within said lower portion of said shipping package, said upper portion of said shipping package is completely telescoped over said lower portion of said shipping package to completely enclose said volume and the fragile articles contained therein and to completely surround the fragile articles by said resilient padding, and said strap positively secures said upper portion of said shipping package to said lower portion of said shipping package.

11. The shipping package of claim 10 wherein said four side walls and said flap closures of said upper portion and said lower portion are formed of at least two plies of corrugated sheet material.

12. The shipping package of claim 11 wherein said corrugated sheet material is formed of cardboard.

13. The shipping package of claim 11 wherein said corrugated sheet material is formed of plastic.

14. The shipping package of claim 10 wherein said four side walls and said bottom flap closure of said lower portion and said top flap closure of said upper portion each include an inner surface, and each said inner surface includes said resilient padding adhesively secured thereto.

15. The shipping package of claim 14 wherein said resilient padding comprises synthetic foam material.

16. The shipping package of claim 10 wherein said resilient padding comprises synthetic foam material.

17. The shipping package of claim 10 wherein at least two opposite of said four side walls of said upper portion and said lower portion include hand holds formed therein.

18. The shipping package of claim 17 wherein said hand holds of said upper portion are each substantially in alignment respectively with corresponding said hand holds of said lower portion when said upper portion and said lower portion are completely telescoped together.

19. The shipping package of claim 10 wherein said releasable and reusable closure means comprises cooperating hook and loop fastener material.

* * * * *